(12) United States Patent
Mowlds et al.

(10) Patent No.: US 10,653,115 B2
(45) Date of Patent: May 19, 2020

(54) SUSPENDED ZIPLINE DOG TOY FOR SOLO PLAY

(71) Applicants: Brian Mowlds, Boring, OR (US); Bret Mowlds, Troutdale, OR (US)

(72) Inventors: Brian Mowlds, Boring, OR (US); Bret Mowlds, Troutdale, OR (US)

( * ) Notice: Subject to any disclaimer, the term of this patent is extended or adjusted under 35 U.S.C. 154(b) by 113 days.

(21) Appl. No.: 15/631,478

(22) Filed: Jun. 23, 2017

(65) Prior Publication Data

US 2017/0290297 A1 Oct. 12, 2017

Related U.S. Application Data

(60) Provisional application No. 62/354,244, filed on Jun. 24, 2016.

(51) Int. Cl.
*A01K 15/02* (2006.01)
*A63F 9/06* (2006.01)

(52) U.S. Cl.
CPC .......... *A01K 15/025* (2013.01); *A63F 9/0601* (2013.01); *A01K 15/02* (2013.01); *A01K 15/027* (2013.01)

(58) Field of Classification Search
CPC .... A01K 15/02; A01K 15/025; A01K 15/027; A63G 9/14; A63G 21/22
USPC ........ 119/707, 708, 728; 473/147, 423, 424, 473/425, 426, 427, 428, 429, 430; 446/228
See application file for complete search history.

(56) References Cited

U.S. PATENT DOCUMENTS

| | | | | |
|---|---|---|---|---|
| 225,404 | A * | 3/1880 | Maxey | A01K 1/04 119/784 |
| 623,596 | A * | 4/1899 | Covington | A01K 1/04 119/784 |
| 1,563,212 | A * | 11/1925 | Madiar | A01K 1/04 119/784 |
| 4,601,261 | A * | 7/1986 | Genelin | A01K 15/027 119/839 |
| 5,070,816 | A * | 12/1991 | Wehrell | A01K 15/027 119/702 |
| 6,334,821 | B1 * | 1/2002 | Kita | A63B 69/0079 473/422 |
| 6,701,873 | B2 * | 3/2004 | Fradette, II | A01K 1/04 119/784 |
| 7,543,550 | B2 * | 6/2009 | Simpson | A01K 15/025 119/708 |
| 9,114,298 | B2 * | 8/2015 | Ruggiero | A63B 69/206 |
| 2006/0266299 | A1 * | 11/2006 | DiAntonio | A01K 15/025 119/708 |
| 2007/0167068 | A1 * | 7/2007 | Floyd | A01K 15/025 439/497 |

(Continued)

*Primary Examiner* — Ebony E Evans
(74) *Attorney, Agent, or Firm* — Miller IP Law, LLC

(57) ABSTRACT

Solo play dog toys including two elevated supports, a zipline releasably attached at its ends to the two elevated supports, an elastic line releasably attached at its ends to a point at or near the ends of the zipline, where the zipline and elastic line are suspended above the ground, a slider slidingly attached to the zipline and affixed to the elastic line so that the slider will slide along the zipline between, and a dog toy affixed to the center portion of the elastic line so that when the dog toy is pulled, the elastic line automatically recenters the dog toy along the zipline. In some examples, the solo play dog toy includes support rings to keep the elastic line elevated.

17 Claims, 4 Drawing Sheets

(56) References Cited

U.S. PATENT DOCUMENTS

| | | | | |
|---|---|---|---|---|
| 2011/0124442 A1* | 5/2011 | Erme | .................... | A63B 43/007 |
| | | | | 473/430 |
| 2014/0088620 A1* | 3/2014 | Tobias | ................. | A61B 17/083 |
| | | | | 606/151 |
| 2017/0319887 A1* | 11/2017 | O'Brien | .................... | A63B 7/00 |

* cited by examiner

SUSPENDED ZIPLINE DOG TOY FOR SOLO PLAY

CROSS REFERENCE TO RELATED APPLICATIONS

This application claims priority to copending U.S. Provisional Application, Ser. No. 62/354,244, filed on Jun. 24, 2016, which is hereby incorporated by reference for all purposes.

BACKGROUND

The present disclosure relates generally to dog toys. In particular, zipline dog toys for solo dog play utilizing a zipline and bungee are described.

Known dog toys are not entirely satisfactory for the range of applications in which they are employed. For example, existing dog toys often require a human to use the toy with the pet. Many pet toys, including balls, flying disks, and ropes, may be used a game etch. However, this requires a human user to pick up and throw the toy repeatedly for their dog to chase. These and other toys may also be used for a game of tug-of-war with the dog. But like fetch, the game requires a degree of human interaction with the dog pulling on one end of the toy, and a person pulling on the other end. These toys and games only work if a human is available and willing to play. The toys may also become dirty or lost after repeated play.

Many people with dogs cannot spend all day every day playing. Many pet and dog owners have work, family, and other obligations during the day which separates them from their pets. These obligations usually mean the dog is left at home alone, and bored. Unless the dog is otherwise taken care of or boarded in a kennel, the is often tries left alone in the yard to roam around. Thus, there exists a need for dog toys that improve upon and advance the design of known dog toys and allow for play and interactions without al owner or other person to be present and willing to play. Examples of new and useful dog toys relevant to the needs existing in the field are discussed below.

SUMMARY

The present disclosure is directed to a solo play dog toy and may include two elevated supports, like trees or poles, separated by a distance with a zipline releasably attached at its ends to the two elevated supports. The zipline should be elevated above the ground. The solo play dog toy also includes an elastic line releasably attached at its ends to a point at or near the ends of the zipline where the elastic line is also suspended above the ground. A slider is slidingly attached to the zipline so that the slider will slide along a length of the zipline between the ends of the zipline. The slider is affixed to a center portion of the elastic line. A dog toy is then affixed to the center portion of the elastic line so that the dog toy is suspended below the elastic line and below the zipline. The dog toy may be pulled and played with, stretching the elastic line along the zipline. When the toy is released, it will automatically snap back to its original position.

In other examples of the inversion, the solo play dog toy may further include one or more support rings. The support rings slidingly attach the elastic line to the zip me in one or more locations along the length of the zipline between the ends of the zipline and along a length of the elastic line between the ends of the elastic line. The support rings hold the elastic line above the ground while allowing the elastic line to stretch and move as the dog toy is pulled. One or more support rings may be releasable carabiners.

In other example of the invention, a loop attachment at one end of the zipline may attach one end of the zipline to one of the two elevated supports by looping the end of the zipline around the elevated support and slidingly attaching the end of the zipline to another point of the zipline. When the zipline is pulled taught, the loop attachment secures the zipline to the elevated support.

Still in other examples, a zipline tightening mechanism is attached to the zipline at one end of the zipline. The zipline tightening mechanism is, in turn, attached to one of the two elevated supports. The zipline may be tightened between the two elevated supports by the zipline tightening mechanism. Tightening the zipline allows the slider to move easily along the zipline and keeps the solo play dog toy elevated off the ground. The zipline tightening mechanism may be a ratchet mechanism.

Still in other examples of the solo play dog toy, the elastic line might be at least one bungee. Alternatively, the elastic line is two bungees, where each of the two bungees attaches to the slider, and the opposite end of each of the two bungees attaches to opposing ends of the zipline. In some examples, the elastic line automatically recenters the dog toy after being displaced. The displacement of the toy and the displacement of the elastic line is generally in a direction parallel to the zipline, along the length of the zipline. The movement of the dog toy along the zipline is guided by the slider.

In some examples, the slider is an elongated, cylindrical tube configured to slidingly fit around the zipline. The slider securely fits onto the zipline, but is loose enough to slide easily. An example of the dog toy might be a length of rope with a toy bungee attached to the rope. The toy bungee releasably attaches to the slider, allowing the toy to move in relation to the slider.

In alternative embodiments of the invention, the solo play dog toy includes two elevated supports separated by a distance, a zipline releasably attached at its ends to the two elevated supports and elevated above the ground. The solo play dog toy further includes an elastic line releasably attached at its ends to the zipline at a point at or near the ends of the zipline, and the elastic line also suspended above the ground. A slider is slidingly attached to the zipline such that the slider will slide along a length of the zipline between the ends of the zipline, and is affixed to a center portion of the elastic line. A dog toy is attached to the slider, such that the dog toy is suspended below the elastic line and below the zipline. This alternative embodiment allows for a different arrangement of attachments between the parts while still allowing for the same functionality of the solo play dog toy.

In other examples of the alternative embodiment, the solo play dog toy may also include one or more support rings. The support rings slidingly attach the elastic line to the zipline in one or more locations along the length of the zipline between the ends of the zipline and along a length of the elastic line between the ends of the elastic line. The one or more support rings may be releasable carabiners.

The alternative embodiment may further include a loop attachment at one end of the zipline, where the loop attachment attaches one end of the zipline to one of the two elevated supports by looping the end of the zipline around the elevated support and slidingly attaching the end of the zipline to another point of the zipline. When the zipline is pulled taught, the loop attachment secures the zipline to the elevated support. The solo play dog toy may also include a zipline tightening mechanism. The zipline may attached to the zipline tightening mechanism at one end of the zipline, and the zipline tightening mechanism is attached to one of the two elevated supports. The zipline may then be tightened between the two elevated supports by the zipline tightening mechanism. The zipline tightening mechanism may be a ratchet mechanism.

In the alternative embodiment, the elastic line may be two bungees, where each of the two bungees attaches to the slider at an end. The opposite end of each of the two bungees attaches to opposing ends of the zipline. The elastic line automatically recenters the dog toy after being displaced. The displacement of the elastic line is generally in a direction parallel to the zipline and is along the length of the zipline.

In the alternative embodiment, the slider may be an elongated, cylindrical tube configured to slidingly fit around the zipline. The dog toy may be a length of rope with a toy bungee attached to the length of rope. The toy bungee may be releasably attached to the slider.

DETAILED DESCRIPTION

Figure 1:
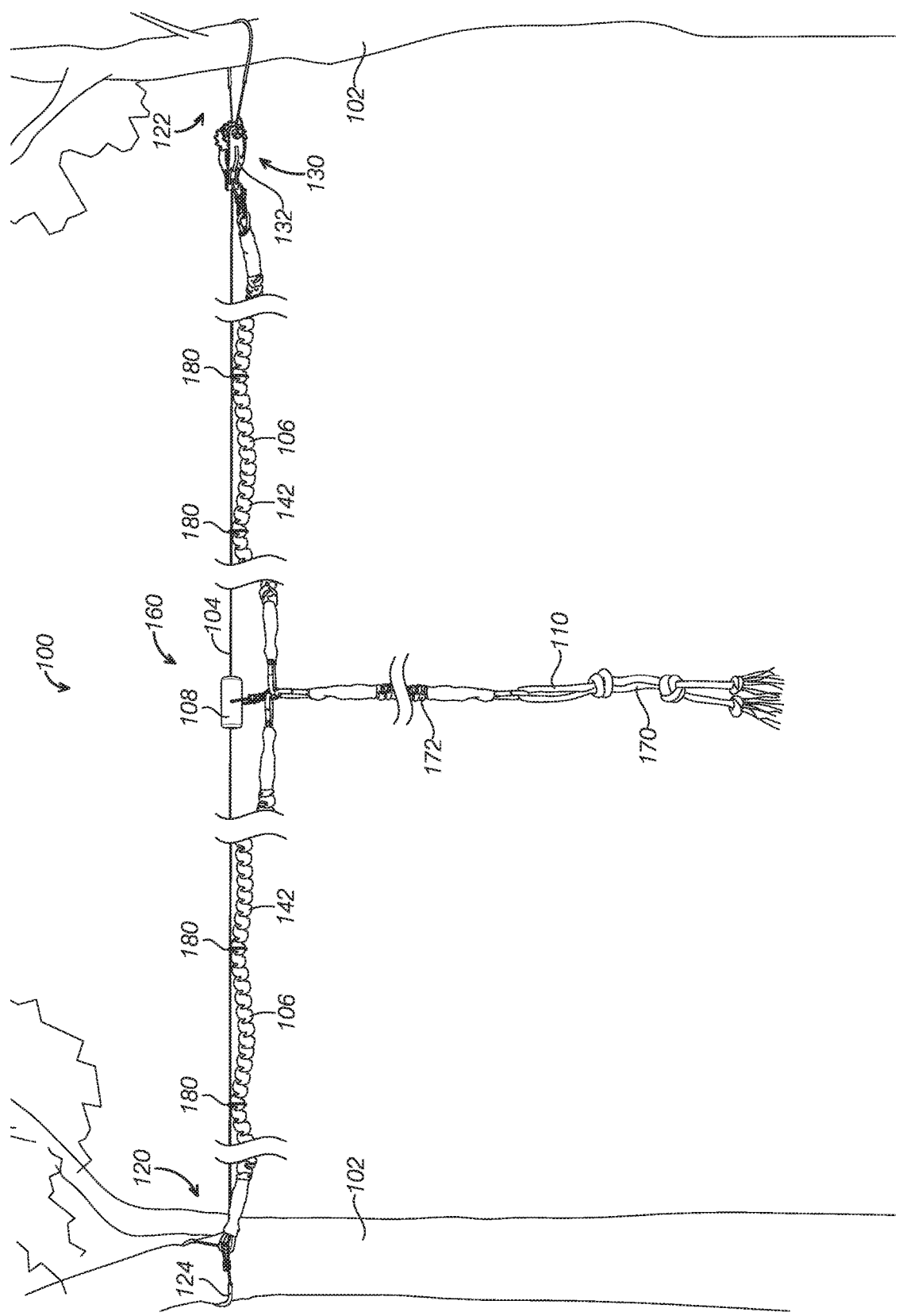
FIG. 1 is a front view of a first example of a zipline solo play dog toy.

The disclosed zipline solo play dog toys will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various zipline dog toys are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-4, a first example of a zipline solo play dog toy, solo play dog toy 100, will now be described. The solo play dog toy 100 functions to entertain dogs in the presence or absence of a person or owner. The reader will appreciate from the figures and description below that solo play dog toy 100 addresses shortcomings of conventional dog toy.

For example, the solo play dog toy 100 simulates games like fetch and tug-of-war with a dog without the owner present. An owner may set up the solo play dog toy in the yard or an open space for the dog to play with whenever bored. The dog toy can be pulled and tugged, and when released, may sling back and forth. This action may simulate a game of fetch, and entertain dogs when someone is not around to play with. Additionally, the solo play dog toy 100 is elevated above the ground, keeping the toy dirt and mud free. The toy is also tethered to a zipline and won't be lost or hidden.

The solo play dog toy 100 includes one or more elevated supports 102, a zipline 104, an elastic line 106, a slider 108, and a dog toy 110. In other examples, the solo play dog toy may include additional or alternative features, such as tightening mechanisms, support rings, alternate attachment locations, or multiple toys for a dog to play with.

As can be seen in FIG. 1, the solo play dog toy 100 may include a line stretched between one or more objects or anchoring points. These anchoring points may be elevated in the air in order to raise the solo play dog toy off the ground. In this example embodiment of the invention, two elevated supports 102 are trees and function to anchor the zipline 104 above ground level. The elevated supports may include any object teat the zipline 104 may attach to which may be elevated in the air above the ground. Examples may include a tree, post, fence, building, column, sign, geological feature, or any other object suitable to anchor and attach the zipline 104. The elevated supports 102 in this example hold the zipline 104 taut and elevated above the ground.

As seen in FIG. 1, the elevated supports 102 may also be separated by a distance, where the distance is measured as a straight line from one elevated support 102 to the other elevated support 102. The distance may be greater or smaller depending on a length of the desired solo play dog toy 100. In this example embodiment, the distance may be in a range of approximately thirty-five to fifty feet. In alternate examples of the solo play dog toy 100, the distance may be shorter than thirty-five feet, while in other examples of the solo play dog toy 100, the distance may be greater than fifty feet.

Still in reference to FIG. 1, the solo play dog toy 100 may include an elevated line between the elevated supports 102. The elevated line should be elevated above the ground and held reasonably taut for the solo play dog toy 100 to perform properly. In this example embodiment, a zipline 104 is stretched between the elevated supports 102 and is elevated above the ground. The zipline 104 may be made of a strong and sturdy material made into a strand form. In this example embodiment, the zipline 104 may be made of a galvanized steel cable, which is weather resistant. Other materials for the zipline 104 may include a nylon rope, braided cord, or any other rope, cable, or line.

As can be seen in FIG. 1, the zipline 104 may include a zipline first end 120, and a zipline second end 122, where each of the zipline first end 120 and the zipline second end 122 are located at opposing ends of the zipline 104. The first end 120 and zipline second end 122 may attach or affix to the elevated supports 102, and may be permanently or releasably attached. In this example embodiment, the zipline first end 120 may releasably attach to one of the elevated supports 102 using a loop attachment 124. The loop attachment 124 attaches the zipline to the elevated support 102 by looping the zipline 104 around one of the elevated supports 102 and reconnecting the zipline 104 to a portion of itself.

Figure 2:
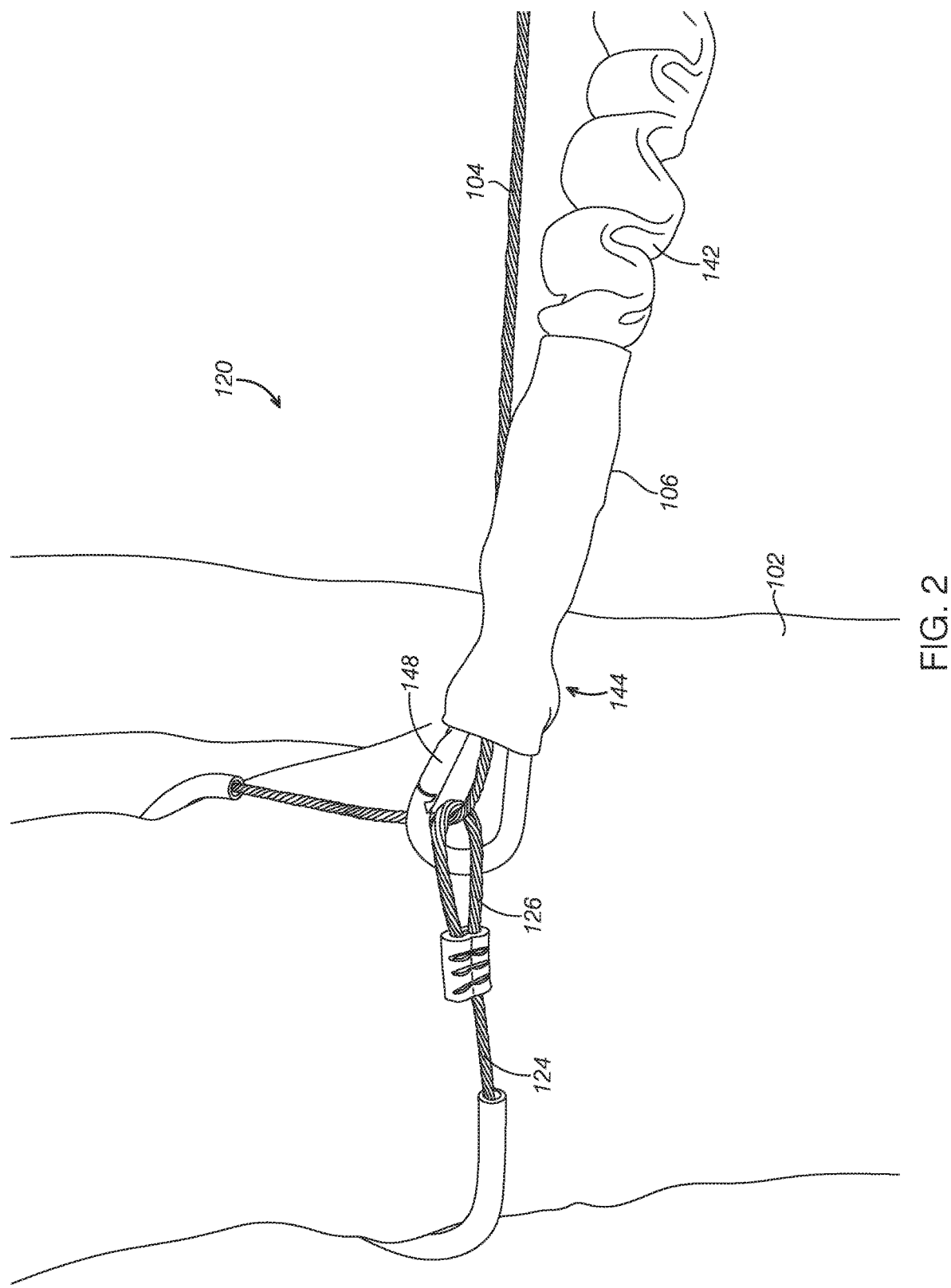
FIG. 2 is an enlarged view of the zipline solo play dog toy shown in FIG. 1 depicting a loop attachment at one end of a zipline.

As can be seen in FIG. 1, and is better exemplified in FIG. 2, the loop attachment 124 at the zipline first end 120 of the zipline 104 may include a first end loop 126 at the zipline first end 120. The first end loop 126, in this example embodiment, is a small loop configured from the zipline 104 by doubling the zipline 104 back towards itself. The end of the zipline 104 is then attached to itself to form the first end loop 126. In order to form the loop attachment 124, and to attach the zipline first end 120 to one of the elevated supports 102, the zipline first end 120, including the first end loop 126, may be wrapped around or brought through the elevated support 102. The zipline second end 122 is then passed through the first end loop 126 of the zipline first end 120 and pulled taut. Tension in the zipline 104 as the zipline second end 122 is pulled will hold and secure the zipline first end 120 to the elevated support 102. In alternate embodiments of the invention, the first end loop may be an additional component, where the zipline first end is tied or otherwise attached to the additional component.

Figure 3:
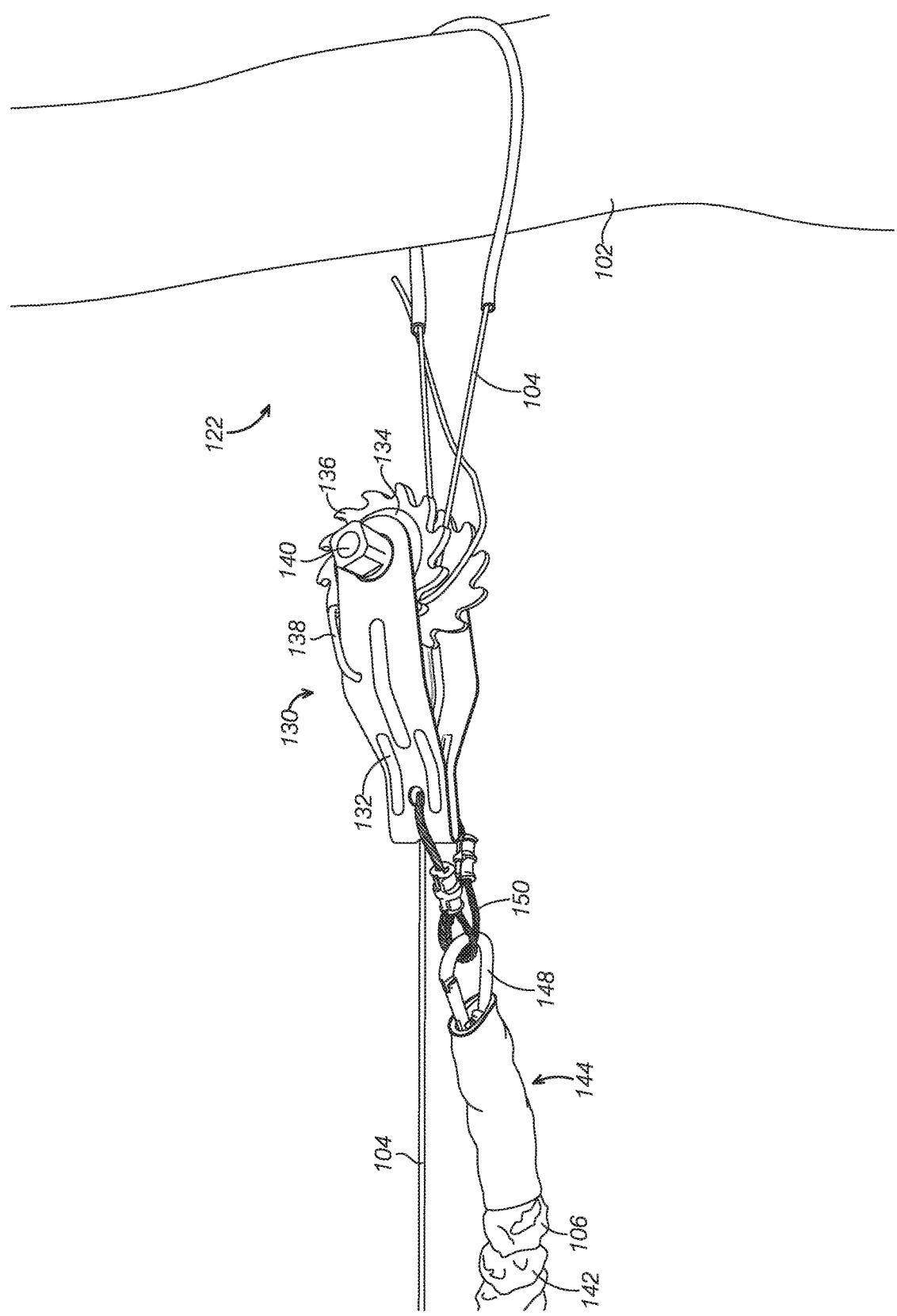
FIG. 3 is an enlarged view of the zipline solo play dog toy shown in FIG. 1 depicting a tightening mechanism at one end of the zipline.

As can be seen in FIG. 1, and is better exemplified in FIG. 3, the zipline second end 122 may be permanently or releasably attached to the elevated supports 102. In this example embodiment, the zipline second end 122 may be permanently or releasably attached to the elevated support 102 and utilize a tightening mechanism 130. In this example embodiment, the tightening mechanism 130 may be a ratchet 132 and may be used with the zipline 104 to attach and tighten the solo play dog toy 100.

As can be seen in FIG. 3, the ratchet 132 may include one or more of a bar or wheel 134 with a set of angled teeth 136, and a pawl 138 to engage with the bar or wheel 134. The pawl 138 may allow the bar or wheel 134 to turn in one direction and not the other by sliding over the angled teeth 136 as the wheel 134 is turned in one direction, and engaging with the angled teeth 136 as the wheel 134 is turned in the opposite direction. Further the ratchet 132 may include a fastener 140 to assist in turning the bar or wheel 134, where a socket wrench, crescent wrench, or other tool may grip or attach to the fastener 140. To operate the ratchet 132 and sufficiently tighten the zipline 104, the zipline second end 122 may be passed through or wrapped around the ratchet 132, then wrapped around or passed through the elevated support 102. Optionally, and as shown in FIG. 3, the zipline second end 122 may then again be wrapped around or passed through the ratchet 132. As the bar or wheel 134 is turned by the fastener 140, the zipline second end 122 may further wrap around the ratchet 132, tightening the zipline. The pawl 138 may slide over the angled teeth 136 until the zipline 104 is sufficiently tight. The pawl 138 then engages with the angled teeth 136, preventing the bar or wheel 134 from turning the opposite direction and alleviating the tension in the zipline 104.

Turning again to FIG. 1, the solo play dog toy 100 may further include an elastic line 106 which may be permanently or releasably attached at its ends to a point at or near the ends of the zipline 104. In this example embodiment, the elastic line 106 may attach to at its ends to points located at or near the zipline first end 120 and the zipline second end 122.

As shown in FIG. 1, the elastic line 106 may be comprised of one or more elastic lines or bungees 142, or may be the grouping of one or more elastic lines. Each bungee may include a bungee first end 144 and a bungee second end 146. The elastic line 106, or the bungees 142, may be an elastic cord made from one or more elastic strands, forming a core with a protective sheath covering the cord. Alternatively, the elastic line 106 may be made from any combination of materials or material configurations that may expand and contract, including springs, cables, or other woven strands.

As seen in FIG. 1, and better exemplified in FIG. 2, the first end 144 of the bungee 142 may permanently or releasably attach to a point at or near the zipline first end 120. In this example embodiment, the bungee 142 at the bungee first end 144 may include a carabiner 148. The carabiner 148 of the bungee first end 144 may allow the bungee first end 144 to releasably attach the loop attachment 124 of the zipline first end 120. In alternate configurations of the invention, the carabiner 148 of the bungee first end 144 may attach to the loop attachment 124 of the zipline first end 120. Still in alternate embodiments, the carabiner 148 of the bungee first end 144 may attach directly to the elevated support 102, which is at or near the zipline first end 120.

As seen in FIG. 1, and better exemplified in FIG. 3, the first end 144 of the bungee 142 may permanently or releasably attach to a point at or near the zipline second end 122. In this example embodiment, the bungee 142 at the bungee first end 144 may include a carabiner 148. The carabiner 148 of the bungee first end 144 may allow the bungee first end 144 to releasably attach the tightening mechanism 130 of the zipline second end 122. To assist in attaching to the tightening mechanism 130, a small looped cable 150 may optionally be used to connect the carabiner 148 to the tightening mechanism 130. Alternatively, the carabiner 148 may attach directly to the tightening mechanism 130. In alternate embodiments, the carabiner 148 of the bungee first end 144 may attach directly to the elevated support 102, which is at or near the zipline second end 122.

Turning again to FIG. 1, the solo play dog toy 100 may further include a slider 108 which may move slidingly along the zipline 104 between the zipline first end 120 and the zipline second end 122. The slider 108 may fit onto, over, or around the zipline 104 in order to slide along the zipline without detaching. The slider 108 may be located on the zipline 104 in a center portion 160 of the solo play dog toy 100. The center portion 160 of the solo play dog toy 100 may be described as a portion of the zipline 104 and elastic line 106 between the zipline first end 120 and the zipline second end 122, or more precisely a portion of the zipline 104 between the loop attachment 124 and the ratchet 132. The slider 108 may be able to slidingly move anywhere in the center portion 160 of the solo dog toy 100.

Figure 4:
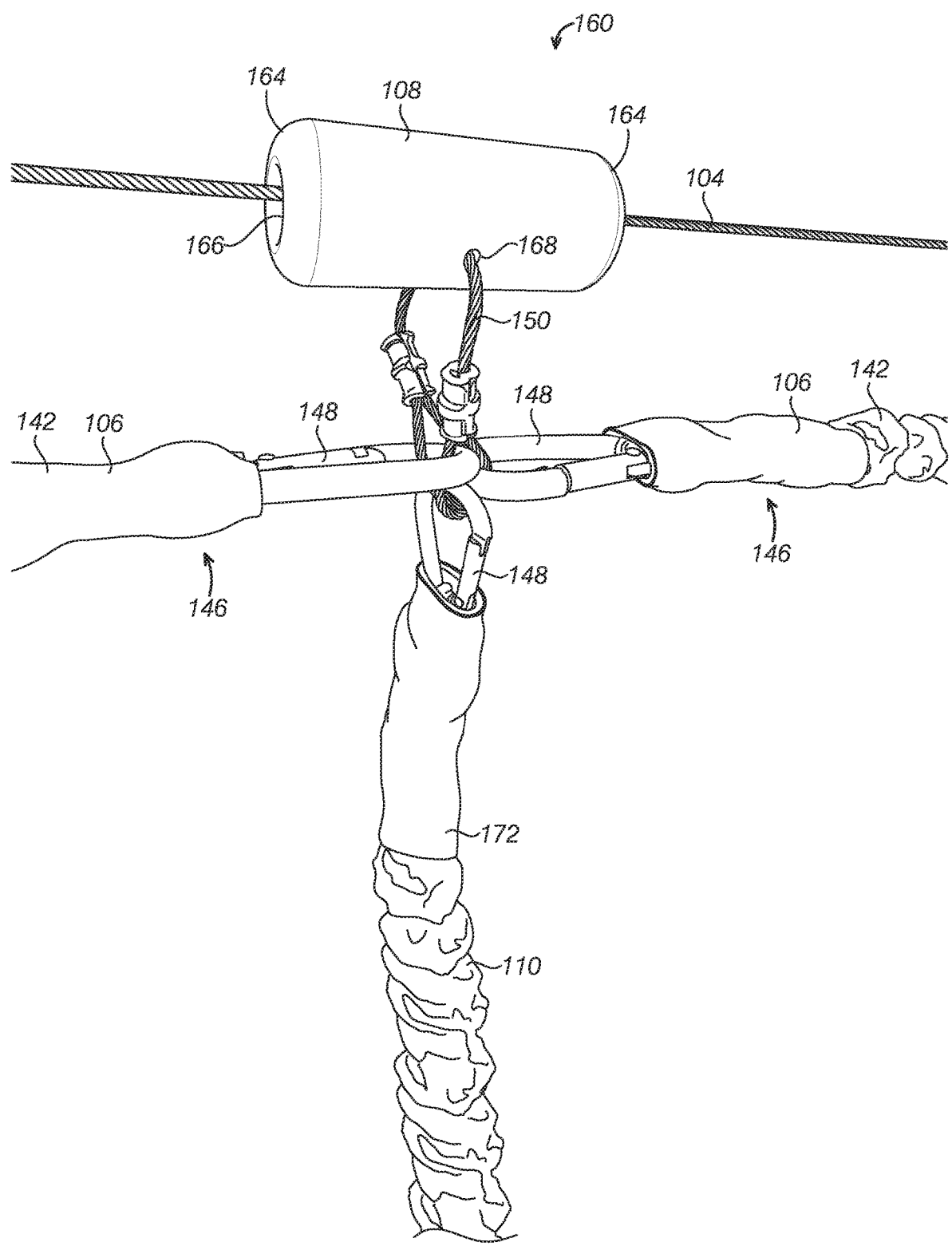
FIG. 4 is an enlarged view of the zipline solo play dog toy shown in FIG. 1 depicting a center portion of the zipline where a slider is attached to elastic lines and a dog toy.

As can be seen in FIG. 1, and better exemplified in FIG. 4, the slider 108 may be an elongated, cylindrical tube configured to slidingly fit around the zipline 104, and may be made from aluminum, steel, hard plastic, or any other hard and suitable material. The slider 108 may include two slider ends 164. A cylindrical inner hole 166 may connect the two slider ends 164 such that the cylindrical inner hole 166 passes through a length of the cylindrical slider 108. The cylindrical inner hole 166 may be larger in diameter than that of the zipline 104 such that the zipline 104 may pass through the cylindrical inner hole 166, and thus the slider 108, with relative ease. Because the zipline 104 passes through the cylindrical inner hole 166, when the zipline 104 is taut, the slider 108 may move slidingly along the length of the zipline 104 between the zipline first end 120 and the zipline 104 second end 122. The movement of the slider 108 will be directly parallel with the direction of the zipline 104.

As exemplified in FIG. 4, the slider 108 may include one or two small holes 168. The small holes 168 may be used to attach other attachments or devices to assist in attachment to the slider 108. In this example embodiment, a small looped cable 150 may pass through one or two of the small holes 168 to provide a point of attachment to the slider 108.

As seen in FIG. 4, the slider 108 may be affixed or attached to a center portion 160 of the elastic line 106. The center portion 160 may include a center portion for the elastic line 106 between the zipline first end 120 and the zipline second end 122. In this example embodiment, the zipline may be two bungees 142, where the bungee first end 144 is attached to the zipline first end 120 and the zipline second end 122. Further, and as seen in FIG. 4, the bungee second end 146 of both of the two bungees 142 of the elastic line 106 may attach to the slider 108. In this example embodiment, the bungee second end 146 may permanently or releasably attach to the slider 108, either directly or with the assistance of the small looped cable 150. The bungee second end 146 may utilize a carabiner 148 to releasably attach to the small looped cable 150 and the slider 108.

As can be seen in FIG. 1, and is further exemplified in FIG. 4, the solo play dog toy 100 may further include a dog toy 110 for a dog or pet to play with. The dog toy 110 may affix or attach to the center portion 160 of the elastic line 106, or to the slider 108. The dog toy 110 may be suspended below the elastic line 106 and the zipline 104. The dog toy 110 may be comprised of a length of rope 170. The dog toy 110 may further include a toy bungee 172 which may be attached to the length of rope 170. The toy bungee 172 may include a carabiner 148 to releasably attach the dog toy 110 to the center portion 160 of the elastic line 106, or the bungees 142, or to the slider 108. In this example embodiment, the dog toy 110 may attach to the center portion 160 of the elastic line 106 where the bungee second ends 146 attach. Alternatively, the dog toy 110 may be shown to attach to the slider 108 because it is attached to the small looped cable 150 of the slider 108. Still alternatively, the dog toy 110 may be comprised of a single length of rope attached to the slider 108 or the elastic line 106, without the inclusion of a bungee.

Turning again to FIG. 1, the solo play dog toy 100 may further include one or more support rings 180 which may assist to support the elastic line, elevating it from the ground. The support rings 180 may be releasable, circular carabiners. Alternatively, the support rings 180 may be solid, circular rings. The support rings 180 may be made from any sturdy and rigid material, including steel, aluminum, or hard plastic. In this example embodiment, the support rings 180 may attach in one or more locations along the length of the zipline between the zipline first end 120 and the zipline second end 122, and slidingly attach the elastic line 106 to the zipline 104. The support rings 180 elevate the elastic line from the ground and allow the elastic line 106 to slidingly move in this elevated position in a direction that is parallel to the zipline 104.

The solo play dog toy 100 functions by allowing a dog or other animal or person to play with and null the dog toy 110 and have the dog toy 110 move and interact back. A dog or other animal, or a person, may grab hold of the dog toy 110, and specifically the length of rope 170, that is suspended below the zipline 104. If the dog toy 110 is pulled downward and released, then the tension in the zipline 104 will pull the toy back upward away from the ground. Alternatively, the dog toy 110 may be pulled in a direction that is parallel to the zipline 104, and in a direction toward the elevated supports 102. As the dog toy 110 is displaced in a direction parallel to the direction of the zipline 104, the dog toy 110 will pull the slider 108 slidingly along the zipline 104. As the slider 108 and dog toy 110 move, the elastic line 106, and more specifically one of the bungees 142, will be pulled in tension and stretch. When the dog toy 110 is released, the elastic line 106 or bungee 142 will automatically snap back to its original position, pulling with it the slider 108 and the dog toy 110. The slider 108 and dog toy 110 will then again be centered automatically by the elastic line 106.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An apparatus, comprising:
   a dog toy;
   a first support;
   a second support, wherein the first support and the second support are separated by a distance;
   a tightening mechanism attached to the second support;
   an inelastic line looped around the first support at a first end of the inelastic line, and attached to the tightening mechanism at a second end to the second support, wherein:
   the inelastic line is elevated above the ground; and
   the inelastic line is an anchored line that remains substantially taut when attached to the first support and the second support to provide a line for the dog toy to slide along;
   a slider comprising a tube fit around the inelastic line, wherein the inelastic line is configured to provide a substantially taut support line for the slider to slide between the first support and the second support;
   a first stretchable and self-retracting line attached at a first fixed end to a loop of the inelastic line looped around the first support and attached at a first sliding end to the slider;
   a second stretchable and self-retracting line attached at a second fixed end to the tightening mechanism and attached at a second sliding end to the slider, wherein:
   the first stretchable and self-retracting line and the second stretchable and self-retracting line are suspended above the ground;
   the first stretchable and self-retracting line or the second stretchable and self-retracting line is configured to temporarily expand or contract in length along a horizontal plane and then return to an original position;

the first stretchable and self-retracting line or the second stretchable and self-retracting line is configured to:
  expand or contract along the horizontal plane as the slider is pulled toward the first support or the second support; and
  center the slider to approximately a center location along the horizontal plane of the inelastic line as the slider is released; and
the dog toy affixed to the first stretchable and self-retracting line, the second stretchable and self-retracting line, and the slider to suspend the dog toy above the ground and below the first stretchable and self-retracting line, the second stretchable and self-retracting line, and the inelastic line.

2. The apparatus of claim 1, further comprising one or more support rings, wherein the support rings slidingly attach the first or the second stretchable and self-retracting line to the inelastic line in one or more locations along a length of the inelastic line between the ends of the inelastic line and along a length of the first or the second stretchable and self-retracting line between the ends of the first or the second stretchable and self-retracting line.

3. The apparatus of claim 2, wherein the one or more support rings are releasable carabiners.

4. The apparatus of claim 1, further comprising a loop attachment at one end of the inelastic line, wherein the loop attachment attaches to a first location along the inelastic line to one of the first support or the second support by looping the end of the inelastic line around the first support or the second support and slidingly attaching an end of the inelastic line to a second location along the inelastic line, such that when the inelastic line is pulled taut, the loop attachment secures the inelastic line to the first support or the second support.

5. The apparatus of claim 1, wherein the inelastic line is tightened between the first support and the second support by the tightening mechanism.

6. The apparatus of claim 5, wherein the tightening mechanism is a ratchet mechanism.

7. The apparatus of claim 1, wherein the first or the second stretchable and self-retracting line is a bungee.

8. The apparatus of claim 1, wherein:
the first or the second stretchable and self-retracting line automatically centers the dog toy after being displaced; and
the displacement of the first or the second stretchable and self-retracting line is in a direction parallel to the inelastic line and is along a length of the inelastic line.

9. The apparatus of claim 1, wherein the dog toy comprises:
  a length of rope; and
  a toy bungee, wherein:
    the toy bungee attaches to the length of rope; and
    the toy bungee releasably attaches to the slider.

10. An apparatus, comprising:
  a dog toy;
  a first support;
  a second support, wherein the first support and the second support separated by a distance;
  a tightening mechanism attached to the second support;
  an inelastic line looped around the first support at a first end of the inelastic line, and attached to the tightening mechanism at a second end to the second support, wherein the inelastic line is an anchored line that remains substantially taut when attached to the first support and the second support to provide a line for the dog toy to slide along;
  a stretchable and self-retracting line attached at its ends to a loop of the inelastic line and the tightening mechanism, wherein:
    a portion of the stretchable and self-retracting line is configured to temporarily expand or contract in length along a horizontal plane and then return to an original position; and
  a slider comprising a tube fit around the inelastic line, the slider attached to the inelastic line and the stretchable and self-retracting line, wherein:
    the inelastic line is configured to provide a substantially taut support line for the slider to slide between the first support and the second support; and
    the stretchable and self-retracting line is configured to:
      expand or contract along the horizontal plane as the slider is pulled toward the first support or the second support; and
      center the slider to approximately a center location along the horizontal plane of the inelastic line as the slider is released.

11. The apparatus of claim 10, further comprising one or more support rings, wherein the support rings slidingly attach the stretchable and self-retracting line to the inelastic line in one or more locations along a length of the inelastic line between the ends of the inelastic line and along a length of the stretchable and self-retracting line between the ends of the stretchable and self-retracting line.

12. The apparatus of claim 11, wherein the one or more support rings are releasable carabiners.

13. The apparatus of claim 10, further comprising a loop attachment at one end of the inelastic line, wherein the loop attachment attaches to a first location along the inelastic line to the first support to loop the end of the inelastic line around the first support and slidingly attach an end of the inelastic line to a second location along the inelastic line, such that when the inelastic line is pulled taut, the loop attachment secures the inelastic line to the first support.

14. The apparatus of claim 10, wherein the inelastic line is tightened between the first support and the second support by the inelastic line tightening mechanism.

15. The apparatus of claim 14, wherein the inelastic line tightening mechanism is a ratchet mechanism.

16. The apparatus of claim 10, wherein:
the stretchable and self-retracting line automatically centers the dog toy after being displaced; and
the displacement of the stretchable and self-retracting line is in a direction parallel to the inelastic line and is along the length of the inelastic line.

17. The apparatus of claim 10, wherein:
the dog toy comprises:
  a length of rope; and
  a toy bungee, wherein:
    the toy bungee attaches to the length of rope; and
    the toy bungee releasably attaches to the slider.

* * * * *